(12) United States Patent
Hirao

(10) Patent No.: US 7,944,150 B2
(45) Date of Patent: May 17, 2011

(54) DISCHARGE LAMP LIGHTING APPARATUS AND PROJECTOR

(75) Inventor: Tetsuji Hirao, Hyoto (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 503 days.

(21) Appl. No.: 12/213,583

(22) Filed: Jun. 20, 2008

(65) Prior Publication Data

US 2008/0315782 A1 Dec. 25, 2008

(30) Foreign Application Priority Data

Jun. 20, 2007 (JP) ................................. 2007-162303

(51) Int. Cl.
*H05B 37/02* (2006.01)

(52) U.S. Cl. ........ 315/224; 315/226; 315/308; 315/360; 353/85

(58) Field of Classification Search .............. 315/209 R, 315/224–226, 291, 297, 307, 308, 360; 353/85
See application file for complete search history.

(56) References Cited

U.S. PATENT DOCUMENTS

| | | | |
|---|---|---|---|
| 6,545,430 B2 | 4/2003 | Ono et al. | |
| 6,670,780 B2 | 12/2003 | Ono et al. | |
| 6,713,972 B2 | 3/2004 | Nakagawa et al. | |
| 6,943,503 B2 | 9/2005 | Ozasa et al. | |
| 7,015,651 B2 * | 3/2006 | Okamoto et al. | ............. 315/224 |
| 7,365,497 B2 * | 4/2008 | Fukuda et al. | ............. 315/209 T |
| 2006/0267512 A1 * | 11/2006 | Okamoto et al. | ............. 315/224 |
| 2008/0137041 A1 * | 6/2008 | Okamoto et al. | ................ 353/85 |

FOREIGN PATENT DOCUMENTS

| | | |
|---|---|---|
| JP | 2001-312997 A | 11/2001 |
| JP | 2002-175890 A | 6/2002 |
| JP | 2003-133091 A | 5/2003 |
| JP | 2003-338394 A | 11/2003 |
| JP | 2004-342465 A | 12/2004 |
| JP | 2005-197181 A | 7/2005 |
| JP | 2006-140016 A | 6/2006 |
| JP | 2006-156414 A | 6/2006 |
| JP | 2006-185663 A | 7/2006 |
| JP | 2007-087637 A | 4/2007 |
| WO | WO-2006-051926 A1 | 5/2006 |

* cited by examiner

*Primary Examiner* — Douglas W Owens
*Assistant Examiner* — Thai Pham
(74) *Attorney, Agent, or Firm* — Rader, Fishman & Grauer PLLC

(57) ABSTRACT

A discharge lamp lighting apparatus for turning on a discharge lamp has a lighting condition in which a projection is formed at a tip of an electrode for electric discharge. In the discharge lamp lighting apparatus, when the polarity-reversal mode is the second mode, the inverter control circuit operates to generate the inverter control signal so that a DC component contained in the output current increases more than that in the first mode, when the polarity-reversal mode is the first mode, and it is detected that the lamp voltage is lower than a predetermined first voltage, the polarity-reversal mode control circuit changes the polarity-reversal mode into the second mode, and when the polarity-reversal mode is the second mode, and it is detected that the lamp voltage is higher than a predetermined second voltage, the polarity-reversal mode control circuit changes the polarity-reversal mode into the first mode.

11 Claims, 7 Drawing Sheets

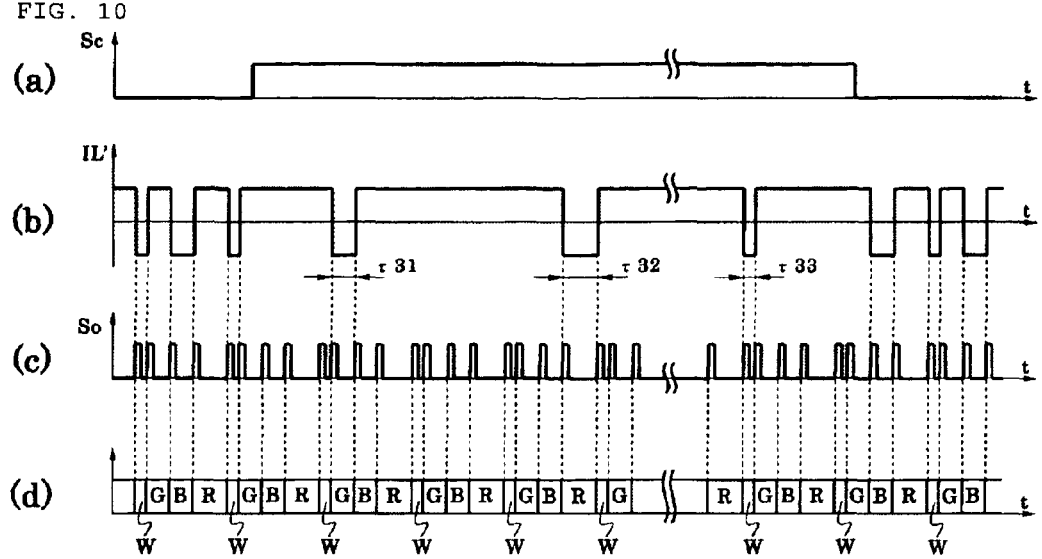
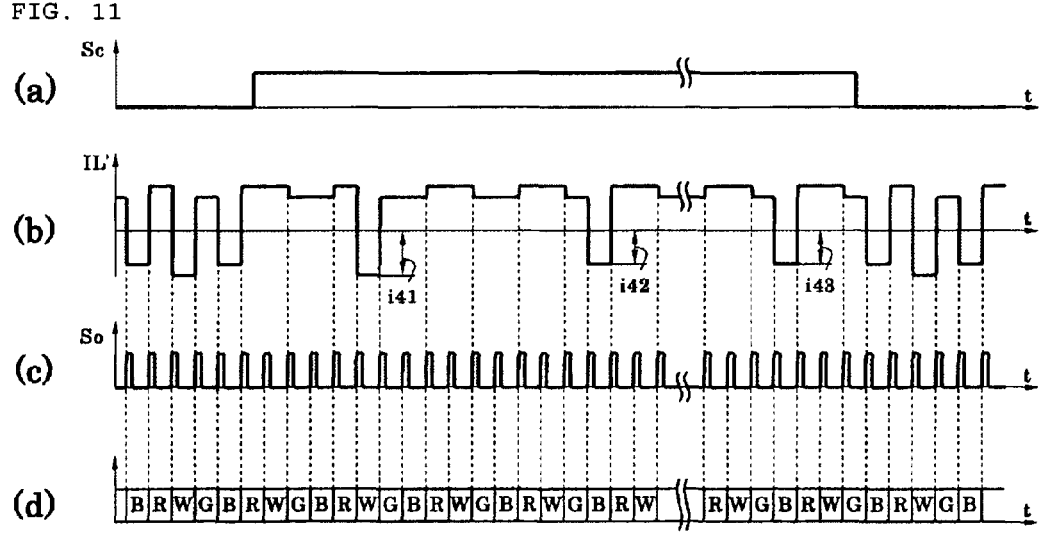

DISCHARGE LAMP LIGHTING APPARATUS AND PROJECTOR

CROSS-REFERENCES TO RELATED APPLICATION

The disclosure of Japanese Patent Application No. 2007-162303, filed Jun. 20, 2007, including its specification, claims and drawings, is incorporated herein by reference in its entirety.

TECHNICAL FIELD

Described herein is a high-pressure discharge lamp used in a projector, especially to a discharge lamp lighting apparatus for a lighting a high intensity discharge lamp, such as a high-pressure mercury lamp, a metal halide lamp, or a xenon lamp, and a projector using the discharge lamp lighting apparatus.

BACKGROUND

For example, in a projector for an optical device used for image display like a liquid crystal projector or a DLP (Trademark) projector, a high intensity discharge lamp (HID lamp) is used. In such a projector, by a dichroic prism etc., light is separated into the three primary colors of red, green, and blue, i.e., a space modulation element provided for each color generates an image of each of the three primary colors, and optical paths thereof are combined by a dichroic prism etc., so as to display a color image.

In another known type of projector, light emitted from a light source is passed through a rotating filter (dynamic color filter) comprising a transmission color wheel having three primary color areas (R, G, and B), thereby sequentially generating light rays of the three primary colors. In synchronization with the generated light rays, the spatial modulation device is controlled so as to sequentially generate an image of each of the three primary colors in a time dividing manner, thereby displaying a color image. When brightness is important, W, that is, white may be added to the three primary colors of R, G and B, so that the dynamic color filter has four colors, whereby an color image may be displayed by sequentially generating these colors, one by one. Or, furthermore, a color image may be displayed, by providing much more color areas thereon, thereby reinforcing color expression capability.

In a discharge lamp lighting apparatus for lighting a discharge lamp as described above, while voltage called a no-load open circuit voltage is impressed to a lamp at start-up, high voltage is impressed to the lamp, in order to generate dielectric breakdown in an electrical discharge space, so that the discharge state changes from glow discharge to arc discharge, and finally, the discharge lamp lighting apparatus is operated so that stable regular lighting may be realized. Usually, such a discharge lamp lighting apparatus has a converter which adjusts an output of an input power supply to a lamp discharge voltage, in order to realize a predetermined input power supplied to the lamp thereby outputting the required lamp current. Moreover, lamp voltage, i.e., output voltage of the converter, is detected, and based on this information, target lamp current is determined according to a value of the quotient which is obtained by dividing, for example, the target electric power by the detection voltage.

Although the lamp discharge voltage in a lighting steady state, i.e., lamp voltage, (VL) becomes low as the distance between tips of two electric discharge electrodes, i.e., the distance between electrodes, becomes short. However, since the light source becomes close to a point light source as the distance between electrodes becomes short, the use efficiency of light emitted from a lamp becomes high. On the other hand, when the same electric power is supplied to the lamp, because of decrease of the lamp voltage (VL), since lamp current (IL) becomes large, there is a disadvantage that generation of heat of a discharge lamp lighting apparatus increases. On the contrary, the light use efficiency becomes low due to a decrease (or losing) of the nature of a point light source as the distance between electrodes becomes long. On the other hand, when the same electric power is supplied to the lamp, because of an increase of the lamp voltage (VL), since only small lamp current (IL) is required, there is an advantage that generation of heat in a discharge lamp lighting apparatus can be reduced.

Therefore, it is not necessarily so advantageous if the distance between electrodes long or it is not necessarily advantageous if it is short. That is, it can be understood that the distance between the electrodes is required to be maintained in a desired range between the maximum and minimum which are determined from the brightness required for a light source of a projector and the limit of heat generation at which the discharge lamp lighting apparatus can be operated.

As types of discharge lamp driving methods, there are a direct current driving method in which a lamp is turned on by a converter, and an alternating current driving method in which periodic polarity reversals are performed by additionally providing an inverter further in the downstream side of the converter. In the case of the direct current driving method, since the light flux from the lamp is like direct current, that is, it does not change with passage of time, basically, there is a big advantage that it can be similarly applied to both types of the above-described projectors.

On the other hand, while in the case of the alternating current driving method, there are disadvantages, resulting from existence of polarity reversals, that is, overshoot, instantaneous light-out at the time of polarity reversals etc. occur, thereby causing a bad influence on a display image etc, there is an advantage that growth or consumption of electrodes of the discharge lamp may be controlled, by using the flexibility of polarity-reversal frequency, which the direct current driving method does not have.

In Japanese Laid Open Patent No. 2001-312997, the conventional technology is described. That is, in order to maintain the distance between electrodes in the desired range, growth or consumption of the electrode of a discharge lamp is controlled by controlling polarity-reversal frequency etc. Specifically, the laid open patent discloses that when a value of the distance between electrodes decreases from a regular value due to formation of a projection portion in the portion which faces the electrode tip section of a high-pressure discharge lamp, the frequency is set to a first frequency. When the projection portion becomes small, and the distance between electrodes increases from a regular value, the frequency is set to a second frequency.

Moreover, for example, Japanese Laid Open Patent No. 2002-175890 discloses a technology in which in a lamp driven by an alternating current and including electrodes having regulation withstand current, a period during which the frequency is 5 Hz or less is one (1) second or more, or a period during which lighting current becomes a rated current value or more is one (1) second or more, is provided.

Furthermore, for example, Japanese Laid Open Patent No. 2003-133091 discloses a technology in that when the voltage between electrodes falls below a predetermined value due to a change of the distance between electrodes during lighting, a period during which an alternating current at a frequency lower than a rated frequency is applied is temporarily provided.

Furthermore, for example, Japanese Laid Open Patent No. 2003-338394 discloses a technology in that in case a lamp is turned on with electric power lower than rated power, when the voltage between electrodes falls below a predetermined value due to a change of the distance between electrodes, a period during which an alternating current at a frequency higher than a frequency of lighting current is provided for only a predetermined time.

Furthermore, for example, Japanese Laid Open Patent No. 2004-342465, discloses a technology in that for a certain period of time immediately after starting an electric-discharge lamp, a polarity-reversal operation of a full bridge circuit is carried out at an alternation frequency which is easy to form a projection of an electrode, and after the certain period of time, a polarity-reversal operation is carried out at an alternation frequency which causes little change to the electrodes. Moreover, the Japanese Laid Open Patent discloses that the alternation frequency is increased as the tube voltage of an electric-discharge lamp rises, and further the time ratio of positive polarity and negative polarity in the polarity reversal operation is changed depending on the state.

Furthermore, for example, Japanese Laid Open Patent No. 2005-197181 discloses a technology in that polarity-reversal frequency is changed to two or more levels, according to the magnitude relation between a lamp voltage and a switching voltage, and a lamp is turned on at a predetermined fixed frequency for a predetermined period after start-up.

Furthermore, for example, Japanese Laid Open Patent No. 2006-140016 discloses a technology in that the frequency of alternating current is regularly or irregularly changed.

Furthermore, for example, Japanese Laid Open Patent No. 2006-156414 discloses a technology in which a bridge drive frequency is controlled to be switched between two or more frequencies at the time of lighting.

Furthermore, for example, Japanese Laid Open Patent No. 2006-185663 discloses a technology in which a polarity-reversal frequency of a bridge is changed according to a lamp voltage.

Furthermore, for example, Japanese Laid Open Patent No. 2007-087637 discloses that when a lighting voltage of a discharge lamp is a first predetermined value or more, the lamp is turned on at a low frequency, and when the lighting voltage of the discharge lamp is a second predetermined value or less, the lamp is turned on without inserting the low frequency.

However, in such conventional technologies, sufficient controllability to maintain the distance between electrodes in the desired range could not be realized. Uncontrollability of the distance between electrodes is remarkable in a lighting condition in which electric power smaller than the actual lamp power capacity is applied to the lamp by lighting modulation. This is because the electrode temperature of the lamp tends to become low on such low electric power conditions, so that a projection at the tip of the electrode tends to grow, and in a response to the lamp voltage drop with the growth of a projection, a lamp current is increased in order to realize a target electric power, so that the efficiency of the weak feedback loop is not good until the temperature of the electrode comes to a rise. Therefore, when the lamp voltage begins to decrease after exceeding the desired range, there is a problem that it takes time to return to the desired range since the lamp voltage cannot be immediately changed to a rise, depending on the conventional technology.

SUMMARY

The subject matter to be solved is to offer a discharge lamp lighting apparatus and a projector, in which it is possible to solve the problem that it takes time to return to a desired range since the lamp voltage is not immediately changed to a rise when the lamp voltage begins to decrease and exceed the desired range of lamp voltage.

The discharge lamp lighting apparatus for turning on a discharge lamp having a lighting condition in which a projection is formed at a tip of an electrode for electric discharge, comprises a power supply circuit which supplies electric power to the discharge lamp; a lamp voltage detection unit which detects a lamp voltage and generates a lamp voltage detection signal; an inverter which inverts an output voltage and passes an output current in form of an alternating current to the discharge lamp; a polarity-reversal mode control circuit which determines a polarity-reversal mode comprising a first mode and a second mode, based on the lamp voltage detection signal; and an inverter control circuit which generates an inverter control signal which specify a polarity-reversal operation of the inverter based on the polarity-reversal mode, wherein in a period of a lighting steady state, excluding an initial lighting period immediately after start up of the discharge lamp, when the polarity-reversal mode is the second mode, the inverter control circuit operates to generate the inverter control signal so that a DC component contained in the output current increases more than that in the first mode, when the polarity-reversal mode is the first mode, and it is detected that the lamp voltage is lower than a predetermined first voltage, the polarity-reversal mode control circuit changes the polarity-reversal mode into the second mode, and when the polarity-reversal mode is the second mode, and it is detected that the lamp voltage is higher than a predetermined second voltage, the polarity-reversal mode control circuit changes the polarity-reversal mode into the first mode.

In the discharge lamp lighting apparatus, the output current may not contain an AC component in a period where the polarity-reversal mode is the second mode.

In the discharge lamp lighting apparatus, in a period where the polarity-reversal mode is the second mode, the inverter control circuit may perform an operation so that the polarity of a DC component is reversed from one polarity to the other polarity.

In the discharge lamp lighting apparatus, the second voltage may be higher than the first voltage, and when the lump voltage reaches a value obtained by adding the first voltage and the second voltage, and then dividing a result of the addition by two, the polarity of the DC component contained in the output current may be changed from one polarity to the other polarity.

In the discharge lamp lighting apparatus, when the lamp voltage reaches a value obtained by adding a minimum value of the lamp voltage and the second voltage and then dividing a result of the addition by two, the polarity of the DC component contained in the output current may be changed from one polarity to the other polarity.

In the discharge lamp lighting, the polarity of a DC component which appears when the polarity-reversal mode is changed into the second mode from the first mode appear, may be made to an opposite polarity to that of a DC component which appears when the polarity-reversal mode is changed into the second mode from the first mode last time.

In the present projector which projects an image using light flux generated by a discharge lamp, the discharge lamp is started and lighted by the above mentioned discharge lamp lighting apparatus.

In the projector, the light flux may be converted to color sequential light flux by a dynamic color filter and an image may be projected thereby and the inverter control circuit may generate the inverter control signal, synchronizing with an operation of the dynamic color filter.

In the present discharge lamp lighting apparatus and a projector it is possible to solve the problem which a lamp voltage cannot be immediately changed to a rise so that it takes time to return to the desired range when lamp voltage begins to decrease and exceed the desired range.

BRIEF DESCRIPTION OF THE DRAWINGS

Other features and advantages of the present discharge lamp lighting apparatus and projector will be apparent from the ensuing description, taken in conjunction with the accompanying drawings, in which:

FIG. 10 is a timing chart showing an operation of a discharge lamp lighting apparatus according to an embodiment;

FIG. 11 is a timing chart showing an operation of a discharge lamp lighting apparatus according to an embodiment;

DESCRIPTION

A description will now be given, referring to embodiments of the present discharge lamp lighting apparatus and projector. While the claims are not limited to such embodiments, an appreciation of various aspects of the present discharge lamp lighting apparatus and projector is best gained through a discussion of various examples thereof.

The descriptions in the specification are provided for illustrative purposes only, and are not limiting thereto. The meaning of these terms will be apparent to persons skilled in the relevant arts based on the entirety of the teachings provided herein.

Figure 1:
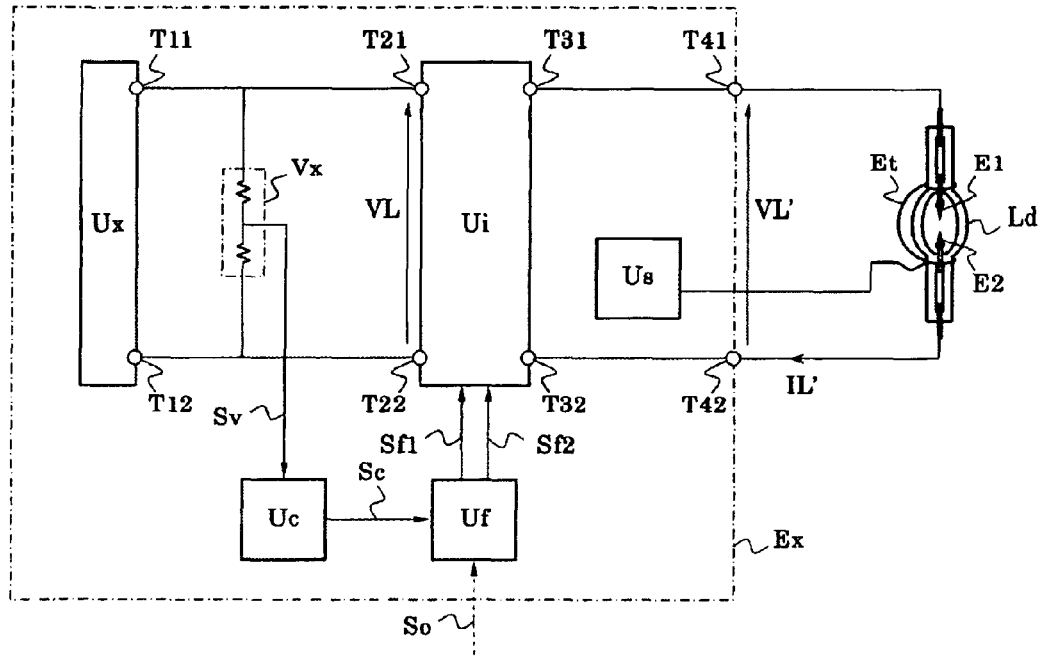
FIG. 1 is a schematic block diagram showing an embodiment of a discharge lamp lighting apparatus.

First, an embodiment is described referring FIG. 1, which is a schematic block diagram of a discharge lamp lighting apparatus. An output from a power supply circuit (Ux) for supplying electric power to a discharge lamp (Ld) is applied to electrodes (E1, E2) for main discharge of the discharge lamp (Ld), through an inverter (Ui). As the power supply circuit (Ux), a step down chopper circuit shown in FIG. 12 (described below) may be used. As the inverter (Ui), a full bridge circuit shown in FIG. 13 (described below) and the like may be used.

A starter (Us) for starting electric discharge is connected to the discharge lamp (Ld). Although this figure shows a so-called external trigger type discharge lamp in which high voltage is impressed to an auxiliary electrode (Et) provided outside the enclosure of the discharge lamp (Ld), the type of trigger of the discharge lamp is not significant to the essence of the embodiment. That is, it is possible to use, for example, a trigger system in which a high-voltage pulse generating circuit is provided in series to the electrodes (E1, E2) for main discharge, so that high-voltage pulse is impressed to the electrodes, or a trigger system in which high voltage generated by resonance, is impressed to the electrodes.

Lamp voltage (VL) (accurately, an absolute value of the lamp voltage) generated between the electrodes (E1, E2) is detected as voltage of nodes (T21, T22) by a lamp voltage detection unit (Vx). In addition, the lamp voltage detection unit (Vx) can be easily realized, using voltage dividing resistors. Although it is suitable that the lamp voltage detection unit (Vx) is provided in an upstream side of the inverter (Ui) and in a portion whose voltage is DC, the lamp voltage detection unit (Vx) may be provided in a portion other than that.

A lamp voltage detection signal (Sv) which is an output signal of the lamp voltage detection unit (Vx) is inputted into a polarity-reversal mode control circuit (Uc). Immediately after start-up, a polarity-reversal mode is set to a first mode in which the polarity-reversal mode control circuit (Uc) is operated based on the lamp voltage detection signal (Sv). When the polarity-reversal mode is the first mode, if it is detected that the lamp voltage (VL) is lower than a predetermined first voltage (Vt1), the polarity-reversal mode is changed into a second mode. When the polarity-reversal mode is the second mode, if it is detected that the lamp voltage (VL) is higher than a predetermined second voltage (Vt2), a polarity-reversal mode signal (Sc) is generated so that the polarity-reversal mode may be changed into the first mode. The polarity-reversal mode signal (Sc) is inputted into the inverter control circuit (Uf) for generating inverter control signals (Sf1, Sf2) which specify polarity-reversal operation of an inverter (Ui).

When the polarity-reversal mode is the first mode, usually, the inverter control circuit (Uf) generates the inverter control signals (Sf1, Sf2) so that a DC component is not contained in the output current (IL'), that is, the average of the output current (IL') becomes substantially zero. On the other hand, when the polarity-reversal mode is the second mode, the inverter control circuit (Uf) generates the inverter control signals (Sf1, Sf2) so that a DC component is contained in the output current (IL'), that is, the average of the output current (IL') does not become zero.

An operation of the discharge lamp lighting apparatus according to the embodiment will be explained, referring to FIG. 2 in which an example of a simplified timing chart is shown. In the figure, (a), (b), and (c) show the lamp voltage (VL), the polarity-reversal mode signal (Sc) and a lighting steady state signal (Ss) showing whether or not it is a lighting steady state, respectively. When the polarity-reversal mode signal (Sc) is low level, it is in the first mode, and when the signal (Sc) is high level, it is in the second mode. The lighting steady state signal (Ss) is low level, it is an initial lighting period, and when the signal (Ss) is high level, it is a lighting steady state period.

When it is detected that the lamp voltage (VL) is lower than the predetermined first voltage (Vt1) at time (t11), the polarity-reversal mode signal (Sc) is changed from low level to high level, so that the polarity-reversal mode shifts to the second mode from the first mode. When the mode shifts to the second mode, as described above, the inverter control circuit (Uf) generates the inverter control signals (Sf1, Sf2) so that a DC component is contained in the output current (IL'). Meaning of the DC component contained in the output current (IL') is that, in one of the electrodes (E1, E2) which are polar opposites, the rate of time when it functions as an anode is large, and in the other electrode, the rate of time when it function as an anode, is small.

Generally, in the anode of the discharge lamp in an arc discharge state, excessive heat is generated more than that generated in the cathode. That is, kinetic energy is released when electrons emitted from the cathode collide with the anode. Moreover, although the energy corresponding to the work function which is required in order that an electron escapes from the cathode to the outside, is released. On the other hand, in the cathode, when an electron escapes from the cathode, heat energy is drawn therefrom in order to carry out the energy corresponding to the work function. The heat generation of the electrodes (E1, E2) which are polar opposites is balanced under condition where a DC component is not contained in the output current (IL') (or a DC component is contained a little). However, under the condition in which a DC component is contained in the output current (IL'), the heat generation is not balanced so that in an electrode in which the rate of time when it functions as an anode is large, excessive heat is generated so that the temperature thereof rises. For this reason, if the amount of the DC component contained therein is set up suitably, the melting of a projection at the tip of an electrode in which the rate of time when it functions as an anode is larger than the other electrode, progresses superfluously, and the melted range is expanded, whereby the distance between the electrodes becomes long, so that falling tendency of the lamp voltage (VL) is suppressed, and then the lamp voltage (VL) comes to change to a rise.

Figure 2:
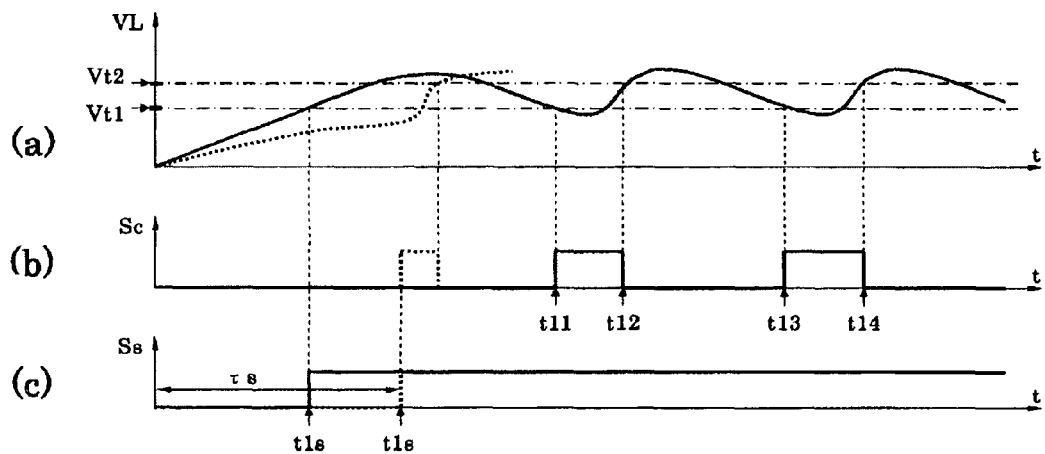
FIG. 2 is a timing chart showing an operation of an discharge lamp lighting apparatus according to an embodiment.

When it is detected that the lamp voltage (VL) is higher than the predetermined second voltage (Vt2) at time (t12) in FIG. 2, the polarity-reversal mode signal (Sc) shifts from high level to low level, so that the polarity-reversal mode returns to the first mode from the second mode. When it returns to the first mode, as described above, the inverter control circuit (Uf) generates the inverter control signals (Sf1, Sf2) so that a DC component is not contained in the output current (IL') (or a DC component is contained little).

For this reason, the condition under which the heat release of the electrode (E1, E2) which are polar opposites is balanced, is recovered, and the excessive heat of the electrode in which rate of time when it functions as an anode is large, stops being generated, so that the superfluous melting of the projection at the tip of the electrode stops, so that the rising tendency of the lamp voltage (VL) ends. After that, if the lamp voltage (VL) changes to the falling tendency, then, as shown at time (t13) of FIG. 2, the lamp voltage (VL) becomes lower than the predetermined first voltage (Vt1), whereby the above-mentioned operation is repeated.

In addition, as described above, although in an initial lighting period immediately after start-up the lamp voltage in an arc discharge state is low, since it gradually goes up within a short time comparatively, towards a lighting steady state, in a period when it has not yet reached the lighting steady state, an operation of generating the inverter control signals (Sf1, Sf2) by setting up the polarity-reversal mode based on the lamp voltage detection signal (Sv) is not necessarily needed. The first mode may be maintained until it reaches a lighting steady state from immediately after start-up. And either when it is detected that the lamp voltage (VL) becomes higher than the predetermined threshold voltage, or when it is detected that a predetermined period elapses after start-up, it may be judged that it has reached the lighting steady state.

In FIG. 2, as an example, the predetermined threshold voltage is set equally to the first voltage (Vt1). FIG. 2 shows a state where it is detected that at time (t1s), the lamp voltage (VL) becomes high than the predetermined threshold voltage, and it is judged that it reached the lighting steady state. In addition, the reason that the condition that the predetermined time elapses after start-up is added to the conditions for determining whether or not it reaches the lighting steady state, is to make it possible to break away from a state where there is no sign that the lamp voltage (VL) reaches the predetermined threshold voltage for judging that the lighting steady state is reached. In FIG. 2, as shown with a broken line, at time (t1s') when a predetermined time (τs) elapses from the start-up, the polarity-reversal mode is changed to the second mode from the first mode, so that the lamp voltage (VL) starts rising.

When the polarity-reversal mode is already the first mode, although it is described above that when the polarity-reversal mode is the first mode, usually, the inverter control circuit (Uf) generates inverter control signals (Sf1, Sf2), so that a DC component is not contained in the output current (IL'), that is, the average of the output current (IL') becomes substantially zero, even when the polarity-reversal mode is the first mode, a little DC component may be contained in the output current (IL'). At this time, the polarity of the little DC component contained in the output current (IL') may be reversed at suitable time intervals. Even in such a case, when the polarity-reversal mode is the second mode, because of the above-described mechanism, the DC component contained in the output current (IL') may be more than that in the time when the polarity-reversal mode is the first mode, to the extent that the lamp voltage (VL) changes to a rising tendency.

In addition, neither the first voltage (Vt1) nor the second voltage (Vt2) needs to be a fixed value peculiar to the discharge lamp lighting apparatus (Ex). As described above, and described below, in a lighting condition in which electric power smaller than the actual lamp power capacity is applied to the lamp by lighting modulation, there is a tendency that the projection at the tip of an electrode easily grows. Since this tendency is remarkable as the amount of lighting modulation gets large, the degree of the projection growth rate at the tip of the electrode, i.e., lamp voltage fall speed, or a lamp voltage fall tendency changes, along with electric power change during a period from rated lighting to the maximum lighting modulation (amount). Therefore, for example, the first voltage (Vt1) may be raised so that the larger the lighting modulation amount is, the earlier the polarity-reversal mode goes into the second mode. Moreover, the second voltage (Vt2) may be lowered, so that the polarity-reversal mode returns to the first mode little early. Thus, the first voltage (Vt1) and/or the second voltage (Vt2) are changed dynamically according to lighting conditions whereby the controllability of lamp voltage can be enhanced.

In addition, in order that the distance between electrodes, i.e., the lamp voltage (VL) can be controlled by the structure of the above described discharge lamp lighting apparatus (Ex), it is necessary to apply it to the discharge lamp having the lighting conditions under which a projection is formed at the tip of an electrode. As to a lamp, the technology can be applied to all discharge lamps which are operated, substantially with the melting of an electrode, at a temperature area near the melting point of electrode material, such as tungsten. Especially, the technology may be preferably applied to a discharge lamp in which the electrodes are arranged at intervals of 2 mm or less in an electric discharge container made of quartz glass, and mercury of 0.20 mg or more per cube millimeter and halogen of $10^{-6}$ to $10^{-2}$ micromolar (µmol) per cube millimeter is enclosed.

Figure 16:
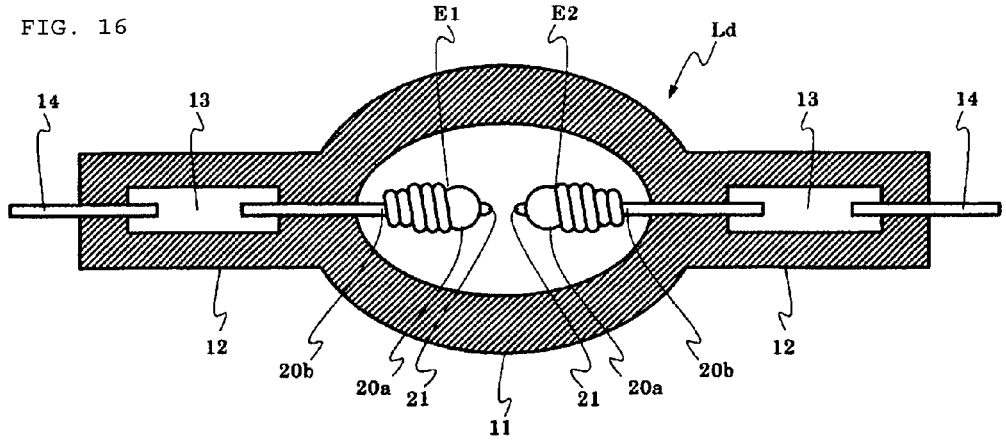
FIG. 16 is a schematic view of a discharge lamp according to an embodiment.

FIG. 16 shows a schematic view of an example of the structure of this lamp. A discharge lamp (Ld) has an approximately spherical light emission section (11) which is formed of an electric discharge container made of quartz glass. A pair of electrodes (E1, E2) facing each other is arranged at an interval of 2 mm or less in the light emission section (11). Moreover, a sealing portion (12) is formed in each of end portions of the light emission section (11). A metallic foil (13) for electric conduction, which is made of molybdenum, is airtightly buried in each of the sealing portion (12) by, for example, shrink sealing. An axis portion of each of the electrodes (E1, E2) is joined to one end of the metallic foil (13). Moreover, an external lead (14) is joined to the other end of the metallic foil (13), so that electric power is supplied from an external power supply apparatus.

Mercury, rare gas, and halogen gas is enclosed in the light emission section (11). Mercury is used to obtain a radiation light with a required visible light wavelength of, for example, wavelength of 360-780 nanometer (nm). The amount of enclosed mercury varies depending on temperature conditions. It provides a very high vapor pressure with 200 or more atmospheric pressure at the time of lighting. Moreover, by enclosing much more mercury, it is possible to make a discharge lamp with mercury vapor pressure of 250 or more atmospheric pressure at time of a lighting operation, or high mercury vapor pressure of 300 or more atmospheric pressure at time of a lighting operation, whereby as mercury vapor pressure becomes higher, a light source more suitable for a projector can be realized.

As rare gas, argon gas of about 13 kPa is enclosed therein. The lighting starting nature is improved by that function. Halogen is enclosed in form of a compound of iodine, bromine, chlorine or the like and mercury or other metals. Although there is a halogen function of extending a life span, using the so-called halogen cycle, as in the present invention, in a discharge lamp in very small size and under very high lighting vapor pressure, there is a function of devitrification prevention of an electric discharge container. In the specification of the discharge lamp (Ld), for example, the maximum outer diameters of the light emission section is 9.5 mm, the distance between electrodes is 1.5 mm, an arc tube internal volume is 75 cube millimeter, rated voltage is 70 V, and rated power is 200 W.

At the tip of the electrodes (E1, E2) (end portion which faces the other electrode), a projection is formed during a lamp lighting operation. Although it is not necessarily clear, the phenomenon in which a projection is formed is considered as set forth below. That is, the tungsten (composition material of an electrode) which is evaporated from a hot section near the tip of the electrode during a lamp lighting operation is combined with halogen and/or remaining oxygen which exists in an arc tube, and, for example, if the halogen is Br, it exists as tungsten compounds, such as WBr, WBr2, WO, WO2, WO2Br, and WO2Br2. These compounds are degraded so as to be tungsten atoms or cations in the hot section in the gaseous phase near the electrode tip. In addition to temperature diffusion (diffusion of the tungsten atom which goes toward a low temperature section, i.e., a portion around the tip of the electrode, from the hot section in a gaseous phase, i.e., in an arc), a tungsten atom is ionized in the arc, so as to become a cation. When an electrode functions as a cathode, the tungsten steamy density in the gaseous phase near the tip of the electrode becomes high since it is drawn in the direction of the cathode by electric field (namely, drift), so that precipitation takes place at the tip of the electrode. Next, when this electrode functions as an anode, the tip of the electrode including the precipitated part melts so as to be shaped with surface tension and a projection is formed.

Each of the electrodes (E1, E2) includes a sphere section (20a) and an axis portion (20b), and a projection (21) is formed at the tip of the sphere section (20a). Even if the projection 21 does not exist at start-up of a lamp lighting operation, it is formed spontaneously due to subsequent lighting. In addition, a numerical example of the size of a projection is given, below. The greatest dimension (diameter) of the electrode (in direction perpendicular to the electric discharge direction) is φ1.0-1.5 mm. When the distance between electrodes is 1.0-1.5 mm, the diameter and projection length of the projection becomes about 0.1-0.6 mm. Since due to the projection, arc discharge becomes small, so that an electric discharge starting point also becomes small. While the use efficiency of light is improved, there is an advantage that generation of a flicker is controlled.

Figure 12:
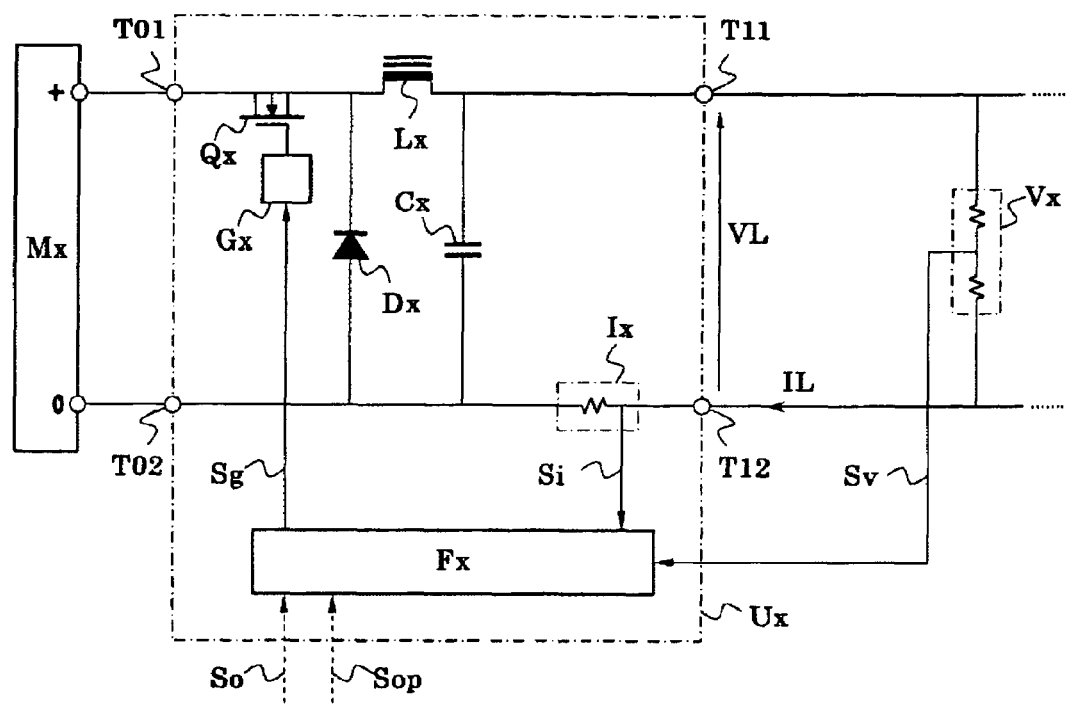
FIG. 12 is a schematic diagram showing part of an embodiment of a discharge lamp lighting apparatus according to an embodiment.

FIG. 12 shows a schematic view of the structure of an example of the power supply circuit (Ux) which can be used with the discharge lamp lighting apparatus according to an embodiment. The power supply circuit (Ux) based on a step down chopper circuit operates in response to supply of voltage from a DC power source (Mx), such as PFC, so that the amount of electric supply to the discharge lamp (Ld) is adjusted. In the power supply circuit (Ux), current from the DC power source (Mx) is turned on and off by a switching element (Qx) such as FET, so that a smoothing capacitor (Cx) is charged through a choke coil (Lx). This voltage is impressed to the discharge lamp (Ld), thereby passing current through the discharge lamp (Ld).

In addition, when the switching element (Qx) is in a period of an ON state, while due to current which passes through the switching element (Qx), current is supplied to the discharge lamp (Ld) which is a load and the smoothing capacitor (Cx) is directly charged so that energy is stored in a choke coil (Lx) in form of magnetic flux. When the switching element (Qx) is in a period of an OFF state, by the energy stored in the choke coil (Lx) in form of magnetic flux, the smoothing capacitor (Cx) is charged through a flywheel diode (Dx) and current is supplied to the discharge lamp (Ld).

In the step down chopper type power supply circuit (Ux), by the ratio of an ON state period of the switching element (Qx) to the operation cycle of the switching element (Qx), i.e., the duty cycle ratio, the amount of electric supply to the discharge lamp can be adjusted. A gate driving signal (Sg) which has a certain duty cycle ratio is generated by the electric supply control circuit (Fx), the current from the DC power supply (Mx) is turned on and off by controlling the gate terminal of the switching element (Qx) through a gate driving circuit (Gx).

The lamp current (IL) (accurately, the absolute value of the lamp current) which flows between the electrodes (E1, E2) of the discharge lamp (Ld) is detected by a lamp current detection unit (Ix). In addition, the lamp current detection unit (Ix) can be easily realized by using a shunt resistor. Although it is suitable that the lamp current detection unit (Ix) is provided in an upstream side of the inverter (Ui) and in a portion whose voltage is DC, the lamp current detection unit (Ix) may be provided in a portion other than that. Moreover, as described above, the lamp voltage (absolute value) generated between electrodes (E1, E2) is detected by the lamp voltage detection unit (Vx).

The lamp current detection signal (Si) from the lamp current detection unit (Ix) and the lamp voltage detection signal (Sv) from the lamp voltage detection unit (Vx) are inputted into the electric supply control circuit (Fx). In a period when the lamp current does not flow at the time of start-up of a lamp lighting operation, the electric supply control circuit (Fx) generates the gate driving signal (Sg) in feedback manner to output a predetermined voltage so as to impress a no-load open circuit voltage to the lamp. When a lamp lighting operation starts and the discharge current flows, the gate driving signal (Sg) is generated in a feedback manner so that a target lamp current may be outputted. The target lamp current is based on a value from which the electric power supplied to the discharge lamp (Ld) turns into a predetermined electric power, depending on the voltage of the discharge lamp (Ld). However, since the voltage of the discharge lamp (Ld) is low and rated power cannot be supplied immediately after start-up of a lamp lighting operation, the target lamp current is controlled not to exceed the fixed limiting value which is called an initial restriction current. And, the voltage of the discharge lamp (Ld) rises with a temperature rise, and current required for a predetermined electric power to be supplied turns into below the initial restriction current, thereby smoothly shifting to a state where the predetermined electric power to be supplied can be realized.

In addition, although the step down chopper circuit is shown as the power supply circuit (Ux), as long as the power supply circuit (Ux) is a converter for converting input electric power into voltage/current suitable for supplying the electric power to the discharge lamp, for example, a circuit in which a step up chopper circuit, a transformer etc. is used, the form of the power supply circuit is not essential to the present invention.

Figure 13:
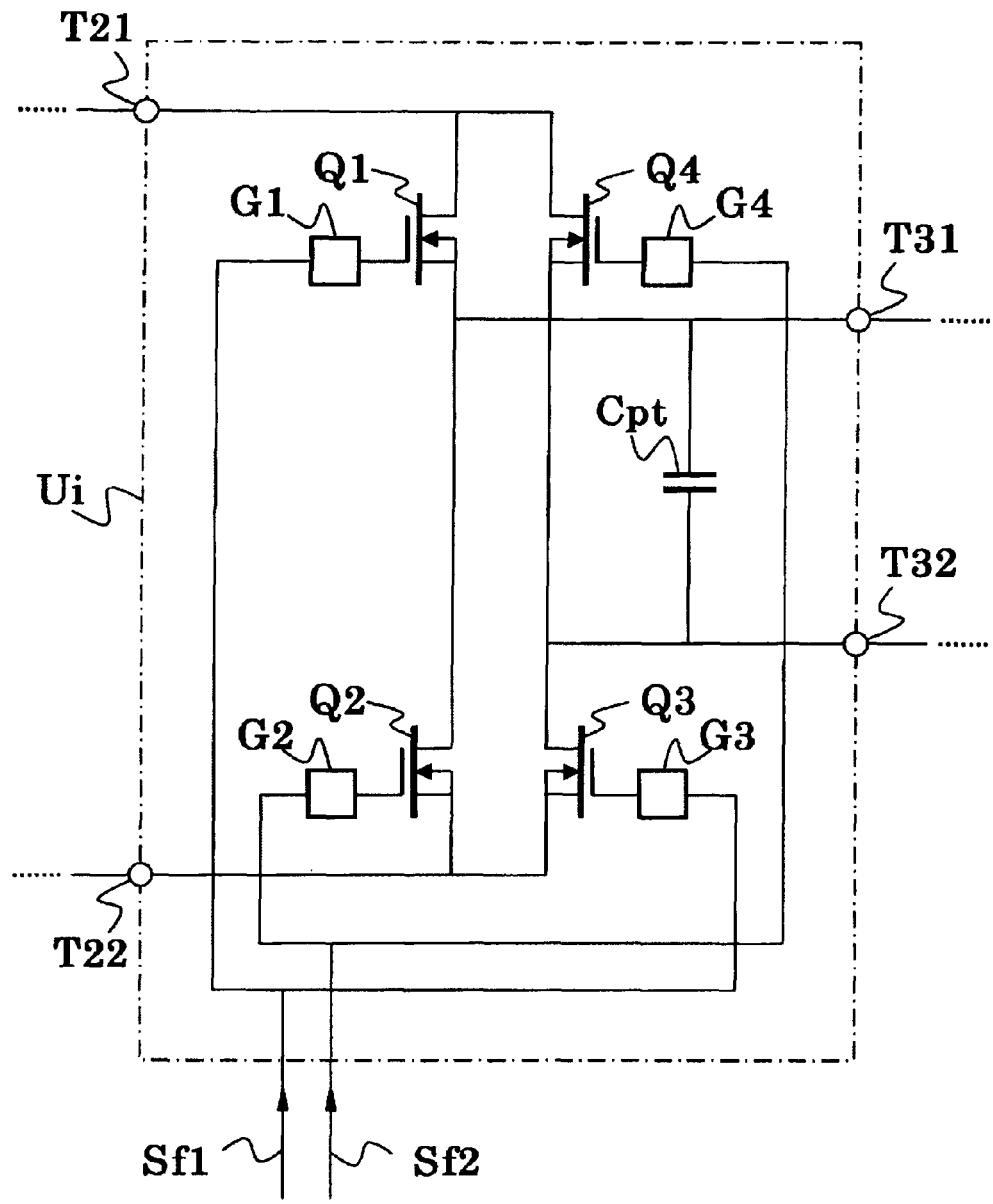
FIG. 13 is a schematic diagram showing part of an embodiment of a discharge lamp lighting apparatus according to an embodiment.

FIG. 13 shows a schematic diagram of an example of the inverter (Ui) which can be used with the discharge lamp lighting apparatus according to an embodiment. The inverter (Ui) is made up of a full bridge circuit which uses switching elements (Q1, Q2, Q3, Q4), such as FETs. Each switching element (Q1, Q2, Q3, Q4) is driven by each gate driving circuit (G1, G2, G3, G4), and with regard to the gate driving circuit (G1, G2, G3, G4), when the switching element (Q1) and the switching element (Q3) which are in a relationship of diagonal elements are in an ON state, the switching element (Q2) and the switching element (Q4) which are in relationship of diagonal elements are maintained in an OFF state. Conversely, when the switching element (Q2) and the switching element (Q4) which are in relationship of diagonal elements are in an ON state, the switching element (Q1) and switching element (Q3) are controlled by the inverter control signals (Sf1, Sf2) generated by the inverter control circuit (Uf) so that the switching element (Q1) and the switching element (Q3) are in an OFF state. When the two above-mentioned phases are switched, a period which is called a dead time is inserted. In the dead time, all the switching elements (Q1, Q2, Q3, and Q4) are turned off. In addition, in case where the switching elements (Q1, Q2, Q3, and Q4) are MOSFETs, a parasitism diode whose forward direction is from a source terminal toward a drain terminal is built in each element itself (not shown). However, in case where a bipolar transistor etc. in which a parasitism diode does not exist, is used therefor, since there is a possibility that the element may be damaged by generation of reverse voltage at the above-mentioned switching time or during the dead time, when the induced current resulting from the inductance component which exists in the downstream side of the inverter (Ui) flows, it is desirable to connect a diode equivalent to a parasitism diode in reverse-parallel. In addition, a capacitor (Cpt) may be installed, when protecting the switching elements (Q1, Q2, Q3, Q4) from surge voltage etc.

Next, description of an embodiment of the output current (IL') in which a DC component is contained, will be described below, referring to a schematic timing chart. An example of the output current (IL') is shown in (b) of FIG. 3. Here, (a) of the figure shows the polarity-reversal mode signal (Sc), and (c) shows a hypothetical output current (IL"), where it is assumed that the polarity-reversal mode does not turn into the second mode. In this case, in the discharge lamp lighting apparatus (Ex), when the polarity-reversal mode signal (Sc) is low level, the inverter control circuit (Uf) generates the inverter control signals (Sf1, Sf2) by which a polarity-reversal operation is not in fact performed at timing shown in a symbol "x" in (c). That is, for example, the polarity-reversal operation at two or more consecutive timing points shown in the symbol "x" in (c) is not performed, but the inverter control signals (Sf1, Sf2) are generated so that the polarity-reversal operation is performed at two continuous timing points shown in a symbol "○" in (c). When the polarity-reversal mode is the second mode in (b), periods of positive side polarity is longer and periods of negative side polarity is shorter. Therefore, the output current (IL') in which a DC component of the positive side polarity is contained as a whole is realized.

In addition, assuming that when the polarity-reversal mode is the first mode, time intervals from a polarity reversal to the following polarity reversal are even, since as described above, the inverter control signals (Sf1, Sf2) are generated so that the polarity-reversal operation is performed at two continuous timing points shown in the symbol "○", a period when the polarity-reversal mode is the second mode and the output current (IL'), which is in a period of the negative side polarity, that is, a period ($\tau 22$) of a polar opposite to the polarity of a DC component contained in the output current (IL') becomes equal to a period ($\tau 21$) which is a half cycle of the polarity reversal in a period when the polarity-reversal mode is the first mode.

Figure 3:
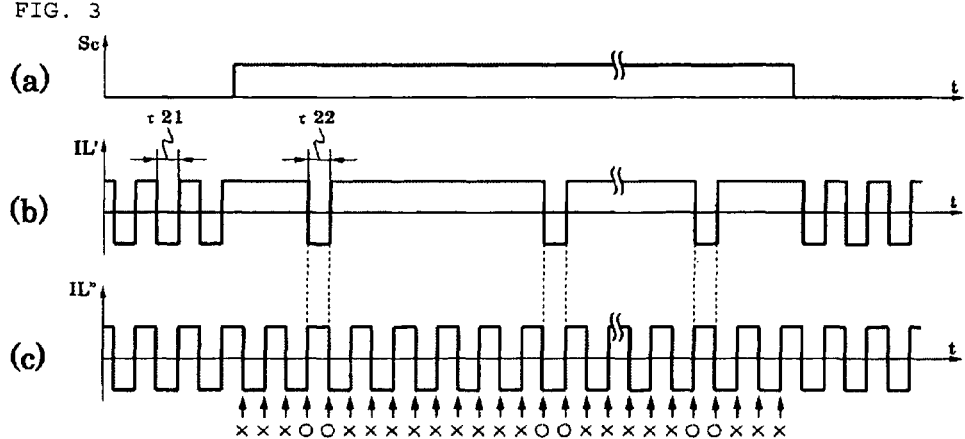
FIG. 3 is a timing chart showing an operation of a discharge lamp lighting apparatus according to an embodiment.

Incidentally, a set of two timing points shown in the symbol "○" at which the polarity-reversal operation is performed, is not continuously provided, as shown in FIG. 3. However, since between sets of two timing points at which the polarity-reversal operation is performed, one or more of timing point at which the polarity-reversal operation is not performed, is inserted, a period of the polarity opposite to the polarity of the DC component contained in the output current (IL') can also be changed so as to be longer than the period ($\tau 22$) (however, illustration thereof is omitted).

Figure 14:
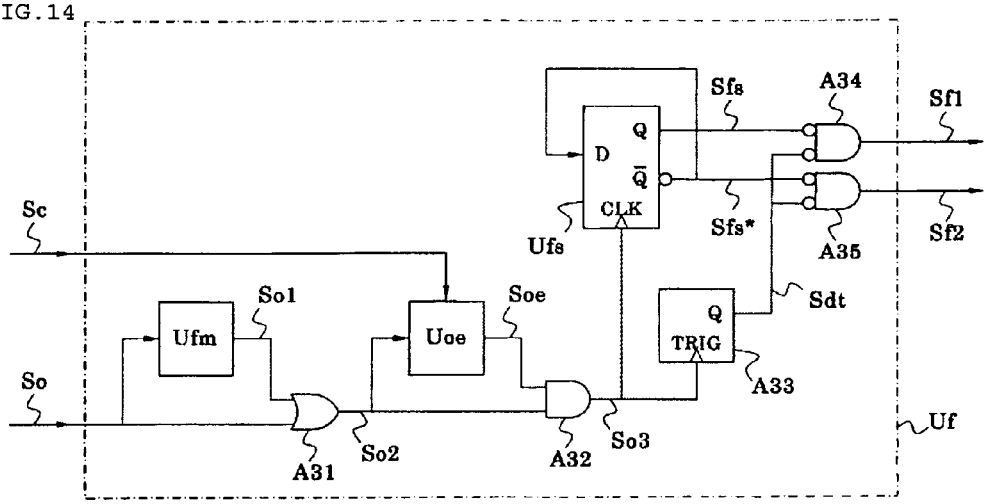
FIG. 14 is a schematic diagram showing part of an embodiment of a discharge lamp lighting apparatus according to an embodiment.

FIG. 14 is a schematic diagram showing the structure of the inverter control circuit (Uf). The inverter control circuit (Uf) has an inverter polarity register (Ufs) which holds an inverter polarity signal (Sfs) which is a bit signal corresponding to the polar state of the inverter (Ui) and which is formed of a D flip-flop. The inverter control signals (Sf1, Sf2) shown in FIG. 1 are generated based on the inverter polarity signal logic inversion signal (Sfs*) which is made up of the inverter polarity signal (Sfs) and its logic inversion signal. However, the inverter polarity-reversal pulse signal (So3) which is a clock signal of the inverter polarity register (Ufs) is inputted into a monostable multivibrator (A33) in order to insert the above-mentioned dead time period, and the monostable multivibrator (A33) generates the dead time signal (Sdt) having a fixed time width in response to a leading edge of an input signal. In a logical gate (A34, A35), the inverter polarity signal (Sfs)

and the inverter polarity signal logic inversion signal (Sfs*) are inputted, and since the dead time signal (Sdt) is inputted into each gate, the inverter control signals (Sf1, Sf2) which are separated by a dead time period are generated.

The inverter polarity signal logic inversion signal (Sfs*) which is one of the output signals of the inverter polarity signal (Ufs) itself is inputted into the inverter polarity register (Ufs). Therefore, every time the inverter polarity-reversal pulse signal (So3) rises, the inverter polarity signal (Sfs) and the inverter polarity signal logic inversion signal (Sfs*) repeat an inversion. An original inverter polarity-reversal pulse signal (So2) is a pulse signal which generates the polarity-reversal timing of the inverter, regardless of the state of the polarity-reversal mode signal (Sc). In fact, a masking is performed to this signal by a AND gate (A32). Only when the inverter polarity-reversal validation signal (Soe) generated in an inverter polarity-reversal validation control circuit (Uoe) based on the polarity-reversal mode signal (Sc), is active, an original inverter polarity-reversal pulse signal (So2) can pass through the AND gate (A32) as the effective inverter polarity-reversal pulse signal (So3).

(c) of FIG. 3 which is described above, shows a state of the hypothetical output current (IL") which is realized according to the original inverter polarity-reversal pulse signal (So2), wherein it is assumed that the inverter polarity-reversal validation signal (Soe) is active, regardless of the state of the polarity-reversal mode signal (Sc). And in fact, in a state where the polarity-reversal mode signal (Sc) corresponds to the second mode, the inverter polarity-reversal validation signal (Soe) is generated so that the original inverter polarity-reversal pulse signal (So2) effectively passes through the AND gate (A32) at the polarity-reversal timing shown in the symbol "○", and passage of the signal (So2) is prevented by the AND gate (A32) at the polarity-reversal timing points shown in the symbol "x".

An inverter polarity-reversal validation control circuit (Uoe) operates, in a state where the polarity-reversal mode signal (Sc) corresponds to the second mode, so that, for example, after ignoring (invalidating) ten timing points of the original inverter polarity-reversal pulse signal (So2), generation of the inverter polarity-reversal validation signal (Soe) is repeated so as to invalidate two continuous timing points. Therefore, not only the polarity-reversal mode signal (Sc) but the original inverter polarity-reversal pulse signal (So2) is inputted into the inverter polarity-reversal validation control circuit (Uoe).

The inverter control circuit (Uf) in this figure, as described below, has a function of receiving, for example, the polarity-reversal timing signal (So) which is synchronized with an operation of a dynamic color filter, from the outside of the discharge lamp lighting apparatus (Ex), as the original inverter polarity-reversal pulse signal (So2), and generating the inverter control signals (Sf1, Sf2). Here, the original inverter polarity-reversal pulse signal (So2) is generated by synthesizing the polarity-reversal timing signal (So) and the polarity-reversal timing signal complement signal (So1) generated in the timing-signal complement circuit (Ufm) at the OR gate (A31). When the polarity reversal timing signal (So) which should be transmitted from an image processing section of a projector is lost, since the alternating current lighting lamp is turned on by direct current, the lamp is damaged. Therefore, the timing-signal complement circuit (Ufm) checks continuously whether the polarity reversal timing signal (So) is inputted as a pulse signal which has proper time intervals. If the pulse signal is not inputted, the polarity-reversal timing compliment signal (So1) is outputted as a substitution signal, in order to avoid the direct current lighting of the lamp.

In addition, the OR gate (A31) may be used as a data selector which chooses either the polarity reversal timing signal (So) or the polarity-reversals timing compliment signal (So1). A gate drive (dedicated) IC of switching elements for a half bridge or a full bridge, which includes functions equivalent to those of the monostable multivibrator (A33) and the logical gate (A34, A35) for inserting the dead time period can also be used therefor (including a case where two half bridges are used).

Certainly, as long as the polarity-reversal timing signal (So) is inputted normally, since renewal of the inverter polarity signal (Sfs) is performed by the inverter polarity register (Ufs), synchronizing with the polarity-reversal timing signal (So), a significant delay or a significant jitter from reception of the polarity-reversal timing signal (So) does not occur. Therefore, part or all of the function of the inverter control circuits (Uf), such as that of the timing-signal complement circuit (Ufm), can be configured, using a microprocessor. Moreover, part or all of the function of the polarity-reversal mode control circuit (Uc) can be configured by the same microprocessor. Thus, there is an advantage that it is possible to add various functions as many as desired without making the circuit structure complicated, when the polarity-reversal mode control circuit (Uc), the timing-signal complement circuit (Ufm), and/or the inverter control circuit (Uf) is formed using a microprocessor (if needed, using a gate drive (dedicated) IC together).

Figure 4:
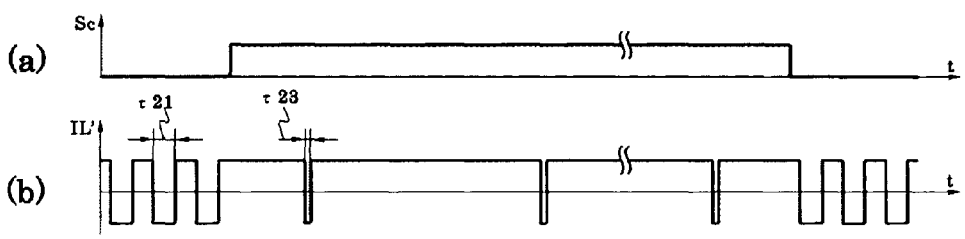
FIG. 4 is a timing chart showing an operation of a discharge lamp lighting apparatus according to an embodiment.

Another example of the output current (IL') is shown in (b) of FIG. 4. (a) shows a polarity-reversal mode signal (Sc). In this case, in the discharge lamp lighting apparatus (Ex), when the polarity-reversal mode of the inverter control circuit (Uf) is the second mode, the period of positive side polarity is longer and the period of negative side polarity is shorter. Therefore, as a whole, the output current (IL') in which a DC component of positive side polarity is contained is realized, and the inverter control signals (Sf1, Sf2) are generated so that a period of the negative side polarity of the output current (IL'), that is, a period (T23) of the polarity opposite to the polarity of the DC component contained in the output current (IL') may be made intentionally shorter than the half cycle length (τ21) of the polarity reversals in the period when the polarity reversal mode is the first mode. The rate of an AC component contained in the output current (IL') becomes small, as the period (τ23) becomes short.

Figure 5:
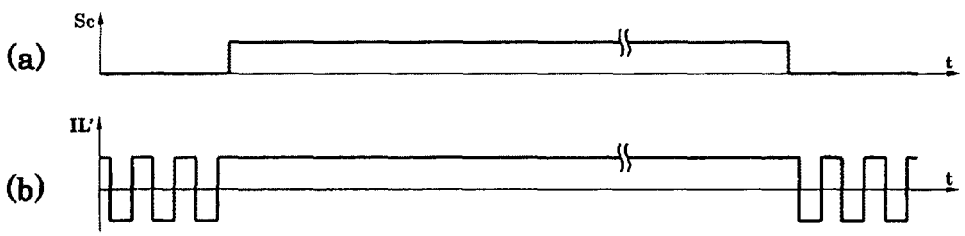
FIG. 5 is a timing chart showing an operation of a discharge lamp lighting apparatus according to an embodiment.

Still another example of the output current (IL') is shown in (b) of FIG. 5. (a) shows a polarity-reversal mode signal (Sc). In this case, in the discharge lamp lighting apparatus (Ex), when the polarity-reversal mode of the inverter control circuit (Uf) is the second mode, the inverter control signals (Sf1, Sf2) are generated so that the output current (IL') in which a period of negative side polarity does not exist so that an AC component is not contained as a whole, may be realized.

In each of the examples of the output current (IL'), shown in FIGS. 3-5 described above, which is the example the rate of the AC component contained in the output current (IL') is smaller in that order. When the present invention is reduced to practice, what mode, that is, what waveform is selected is basically determined depending on what rate of AC component contained in the output current (IL') is.

When the electric power supplied to the discharge lamp (Ld) is the same, without respect to the mode, that is, whether the polarity-reversal mode is the first mode or the second mode, since generation of excessive heat concerning the projection melted at the tip of the electrode increases, the more DC component contained in the output current (IL') (i.e., as the rate of the AC component contained therein is small) is, the faster melting speed of the projection becomes. Therefore, the lamp voltage (VL) goes up quickly as there is a more DC component contained therein, and time to reach the second voltage (Vt2) becomes short, so that there is an advantage that efficiency of lamp voltage control is improved.

On the other hand, since in such a heat phenomenon, the speed of response is slow, when there is too much DC component contained therein so that there is too much generation of the excessive heat concerning the projection melted at the tip of the electrode, for example, the lamp voltage (VL) reaches the second voltage (Vt2), and even if polarity-reversal mode returns to the first mode from the second mode, the projection melting tendency at the tip of the electrode does not stop immediately, so that there is a problem that the excessive projection melting occurs due to the overrun. The less a DC component is contained in the output current (IL'), the easier such an excessive projection melting is controlled. Therefore, since the amount of the DC component contained in the output current (IL') has a relation of a trade-off between the efficiency of the lamp voltage control, and the easiness of control of the excessive projection melting, it is necessary to find suitable conditions experimentally.

In addition, the amount of a DC component contained in the output current (IL'), during a period in which the polarity-reversal mode is the second mode, is not necessarily constant. It is possible to enhance the controllability of lamp voltage by dynamical change according to lighting conditions. For example, immediately after the polarity-reversal mode shifts to the second mode, the amount of a DC component is increased (for example, the maximum, i.e. the condition under which an AC component is not contained), and the rate of increasing speed of the lamp voltage (VL) is made into the maximum. And then, the amount of a DC component contained in the output current (IL') is gradually or continuously reduced, as the lamp voltage (VL) approaches the second voltage (Vt2), so that it is possible to control and prevent the excessive projection melting due to the overrun.

Incidentally, when the gate driving circuit in the inverter (Ui) is formed by applying the so-called charge pump circuit, there may be a lower limit of the frequency of the polarity reversals of the inverter (Ui). Specifically, that is a case where a circuit generally called a high side driver is used as the gate driving circuit (G1, G4). In this kind of circuit, power supply for the gate driving of the switching element (Q1, Q4) in a side of the high side is covered by electric charges accumulated in a capacitor in the gate driving circuit (G1, G4), and this electric charges are filled up every time the polarity reversal of the inverter (Ui) takes place (is repeated). If the inverter (Ui) stops a polarity-reversal operation over a long period of time, since the electric charges are lost by electric discharge so that the gate drive of the switching element (Q1, Q4) cannot be gate-driven, thereby resulting in a lower limit as to the frequency of the polarity reversals of the inverter (Ui).

In such a case, even if it is the condition under which it is possible to fully control an excessive projection melting according to the output current (IL') which does not contain an AC component, for example, as in FIG. 5, the inverter control circuit (Uf) can be operated so as to generate the output current (IL') shown in FIG. 4 which has the period (τ23) in which the charge pump circuit described above at least operates normally.

In the explanation about the above embodiment, the embodiments in which the polarity of a DC component contained in the output current (IL') is fixed during a period in which the polarity-reversal mode is in second mode, are described. In the case of such an operation, the projection melting occurs only in one of the electrodes (E1, E2) which are polar opposites, thereby causing asymmetrical electrode consumption, so that there is a problem that the life span is shortened, compared with the case where the electrode is consumed symmetrically. In the present invention, in a period where the polarity-reversal mode is the second mode, this problem can be avoided by reversing the polarity of a DC component contained in the output current (IL').

Figure 6:
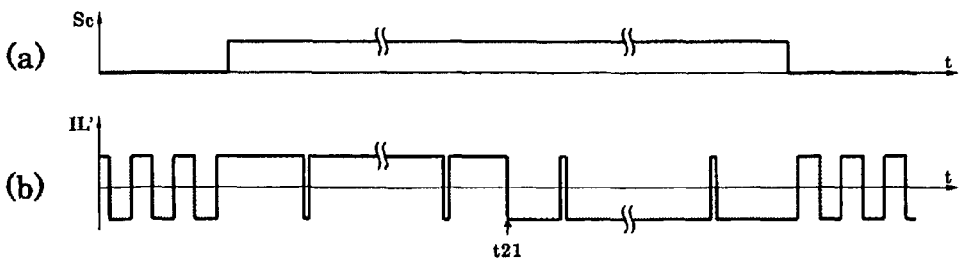
FIG. 6 is a timing chart showing an operation of a discharge lamp lighting apparatus according to an embodiment.

For example, an example of the output current (IL') is shown in (b) of FIG. 6. (a) shows a polarity-reversal mode signal (Sc). In the discharge lamp lighting apparatus (Ex), in the inverter control circuit (Uf), the polarity-reversal mode signal (Sc) becomes high level, after the polarity-reversal mode turns into the second mode, and until a time point (t21), the period of positive side polarity is long and the period of negative side polarity is short. Therefore, the DC component of positive side polarity contained in the output current (IL') as a whole is realized. The polarity-reversal mode signal (Sc) turns into low level after the time point (t21), and until the polarity-reversal mode returns to the first mode, the inverter control signals (Sf1, Sf2) are generated so that the negative side polarity is long, and the period of positive side polarity is short so that the DC component contained in the output current (IL') as a whole, is realized.

Figure 7:
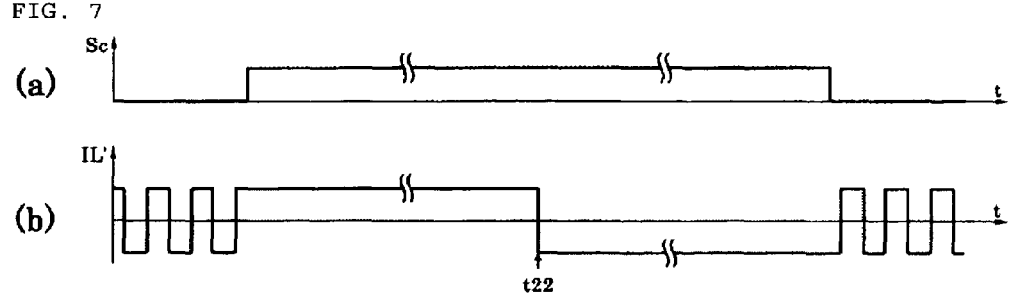
FIG. 7 is a timing chart showing an operation of a discharge lamp lighting apparatus according to an embodiment.

Moreover, another example of the output current (IL') is shown in (b) of FIG. 7. (a) shows a polarity-reversal mode signal (Sc). In the discharge lamp lighting apparatus (Ex), in the inverter control circuit (Uf), the polarity-reversal mode signal (Sc) becomes high level, and after the polarity-reversal mode turns into the second mode, and until a time point (t22), there is only the period of positive side polarity and there is no period of negative side polarity. Therefore, the output current (IL') which does not contain AC component is realized, and the polarity-reversal mode signal (Sc) turns into low level after the time point (t22), so that there is only the period of negative side polarity and there is no period of positive side polarity, until the polarity-reversal mode returns to the first mode. Therefore, the inverter control signals (Sf1, Sf2) are generated so that the output current (IL') in which an AC component does not contain may be realized.

As shown in FIGS. 6 and 7, in a period in which the polarity-reversal mode is the second mode, by reversing the polarity of a DC component contained in the output current (IL'), an electrode in which the projection melting occurs at the tip thereof, is switched before and after the reversal between the electrodes (E1, E2) which are polar opposites. For this reason, it is possible to avoid the problems that a projection melting takes place only in one side of the electrodes (E1, E2) which are polar opposites, and asymmetrical electrode consumption occurs.

In addition, from a viewpoint of avoiding a problem that asymmetrical electrode consumption takes place, the timing of the time points (t21, t22) at which the polarity of a DC component contained in the output current (IL') is reversed in a period during which the polarity-reversal mode is the second mode, is suitably set as timing at which the lamp voltage (VL) reaches exactly the middle voltage of the second voltage (Vt2) and the first voltage (Vt1), i.e., a value obtained by adding the second voltage (Vt2) and the first voltage (Vt1), and then dividing the result of the addition by two (2). That is, since a voltage rise amount of the lamp voltage (VL) generated in a period before reversal of the polarity of a DC component contained in the output current (IL') and a voltage rise amount thereafter are the same in a period during which the polarity-reversal mode is the second mode if the time (t21, t22) is set as mentioned above, it can be assumed that, during the period, the electrode length reduced by the projection melting at the tip of the electrode is also the same.

In addition, when the polarity-reversal mode is changed into the second mode, the lamp voltage (VL) does not start to rise immediately, and the lamp voltage drops a little less than desired. After that, finally, the lamp voltage (VL) may start to rise. In such a case, the time points (t21, t22), are suitably set as timing at which the lamp voltage (VL) reaches a value obtained by adding the minimum value of the lamp voltage (VL) which is detected after changing the polarity-reversal mode into the second mode and the second voltage (Vt2) and by dividing the result of the addition by two (2).

In addition, in a period during which the polarity-reversal mode is the second mode, although only the embodiment in which the number of times of the polarity reversals of a DC component contained in the output current (IL') is one (1) is showed above, the polarity of a DC component contained therein may be reversed twice or more (however, illustration thereof is omitted).

Figure 8:
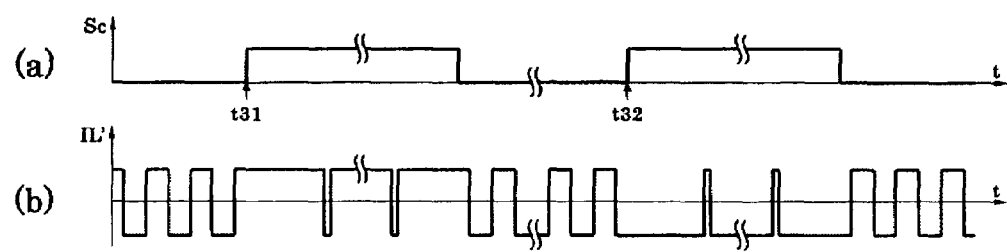
FIG. 8 is a timing chart showing an operation of a discharge lamp lighting apparatus according to an embodiment.

In the explanation of the above embodiment, when the polarity-reversal mode is shifted to the second mode, the polarity of a DC component contained in the output current (IL'), is arbitrarily selected, that is, it may be either positive side polarity or negative side polarity. However, by devising this, the problem that the asymmetrical electrode consumption takes place can be avoided. For example, an example of the output current (IL') is shown in (b) of FIG. 8. (a) shows a polarity-reversal mode signal (Sc). In this example, in the discharge lamp lighting apparatus (Ex), the inverter control circuit (Uf) generates the inverter control signals (Sf1, Sf2) so that the polarity of a DC component which appears when the polarity-reversal mode is changed into the second mode at the time point (t32) may be negative side polarity which is opposite to the polarity (positive side polarity) of a DC component which appeared at the time point (t31), at which the polarity-reversal mode was changed into the second mode last time.

And every time the polarity-reversal mode is changed into the second mode, the polarity of a DC component to be generated becomes alternatively repeatedly positive side polarity and negative side polarity. Thus, by using the technology of reversing the polarity of a DC component to be generated every time the polarity-reversal mode is changed into the second mode, a side in which the projection melting of the electrodes (E1, E2) which are polar opposites takes place can be switched by turns, so that it is possible to avoid the problem that a projection melting occurs only in one side thereof thereby causing asymmetrical electrode consumption.

Figure 9:
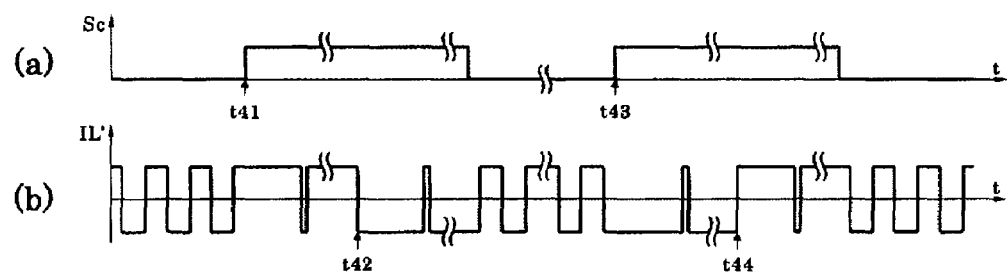
FIG. 9 is a timing chart showing an operation of a discharge lamp lighting apparatus according to an embodiment.

In a period during which the polarity-reversal mode is the second mode, this technology can be combined with the technology of reversing the polarity of a DC component contained in the output current (IL'). For example, an example of the mode of the output current (IL') is shown in (b) of FIG. 9. (a) shows a polarity-reversal mode signal (Sc). In this example, in the discharge lamp lighting apparatus (Ex), the inverter control circuit (Uf) generates the inverter control signals (Sf1, Sf2) so that the polarity of a DC component which appears when the polarity-reversal mode is changed into the second mode at the time point (t43) may be negative side polarity which is opposite to the polarity (positive side polarity) of a DC component which appeared at the time point (t41), at which the polarity-reversal mode was changed into the second mode last time.

And at the time (t44) which is after the time point (t43), in the period in which the polarity-reversal mode is the second mode, the polarity of a DC component which is contained in the output current (IL') is reversed. It is the same at a time point (t42) which is after the time (t41) during the period in which the polarity-reversal mode is the second mode. Thus, the problem is more effectively avoided by using together two countermeasures in order to prevent the problem which causes asymmetrical electrode consumption.

Figure 15:
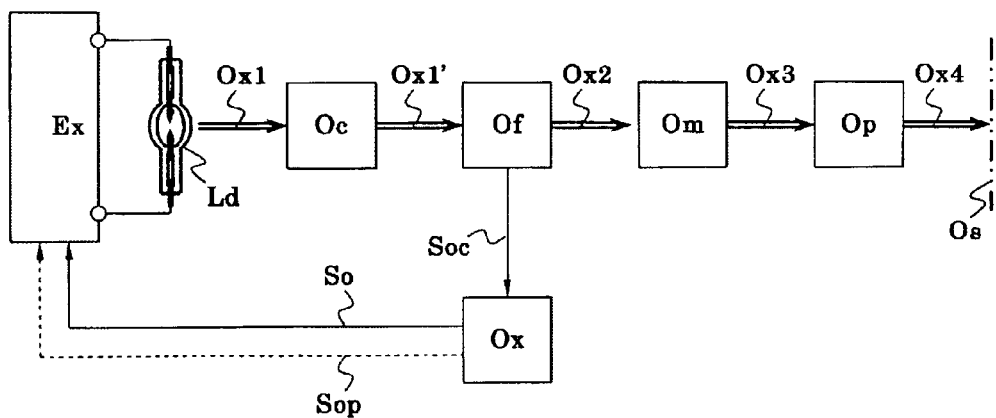
FIG. 15 is a schematic block diagram of an embodiment of a projector.

FIG. 15 is a schematic block diagram of an embodiment of a projector. Light flux (Ox1) emitted from the discharge lamp (Ld) which is started and turned on by the discharge lamp lighting apparatus (Ex) according to the embodiment, becomes light flux (Ox1') which passes through a capacitor optical system (Oc) containing a concave mirror, a condenser lens, etc. provided if needed, and then is converted to the color sequential light flux (Ox2) by the dynamic color filters (Of). The color sequential light flux (Ox2) is modulated to color sequential image flux light (Ox3), by a space modulation element (Om) which uses a DMD (TM), LCD, LCOS (reflection type liquid-crystal-display panel), etc. and a projection image is formed on a screen (Os) provided outside the projector, or integratedly provided with the projector, by a projection lens (Op).

The image processing unit (Ox) of the projector generates a signal (Soc) corresponding to the appearing color information of the dynamic color filters (Of) based on a pulse count value from a sensor such as a rotary encoder, or an initial detection of the rotational angle and a time passage count value etc., in order to meet the operational necessity of the discharge lamp lighting apparatus (Ex). Based on this, the polarity-reversal timing signal (So) is generated and transmitted to the discharge lamp lighting apparatus (Ex). At this time, in order to specify the phase in one cycle of the polarity-reversal timing signal (So) if needed, a modulation cycle initialization signal (Sop) is generated and transmitted to the discharge lamp lighting apparatus (Ex), or the polarity-reversal timing signal (So) to be transmitted to the discharge lamp lighting apparatus (Ex) is modulated. An arbitrary modulation method can be used therefor as long as it is possible to easily recognize whether or not modulation has been carried out, that is, if the modulation cycle initialization signal (Sop) can be easily reproduced by demodulation. For example, in case where the polarity reversal timing signal (So) is transmitted in form of a signal with a short pulse width and a long pulse width, when a signal with the pulse width longer than regular time width is received, the received signal is processed as the polarity reversal timing signal (So), and conversely, when a signal with a short pulse width is received, the signal is recognized as a signal on which the modulation has been carried out so that it is possible to demodulate the received signal, regarding it as the modulation cycle initialization signal (Sop) which is received with the polarity reversal timing signal (So).

For example, in a case where a dynamic color filter is a color wheel which consists of four colors of R, G, B, and W, when the polarity reversal of the inverter (Ui) of the discharge lamp lighting apparatus (Ex) is performed at each color area transition, an inverter control circuit (Uf) generates the inverter control signals (Sf1, Sf2) synchronizing with the polarity-reversal timing signal (So). The output current in this case (IL') is shown in (b) of FIG. 10. Here, (a) of the figure shows a polarity-reversal mode signal (Sc), (c) shows the polarity-reversal timing signal (So), and (d) schematically shows color appearing in the dynamic color filter.

In this figure, when the polarity-reversal mode is the first mode (Sc), i.e., the polarity-reversal mode signal is low level, every time the transition to the high level of the polarity-reversal timing signal (So) is received, the polarity reversal of the output current (IL') i.e. the inverter (Ui), is performed.

When the polarity-reversal mode is the second mode, i.e., the polarity-reversal mode signal (Sc) is high-level, after invalidating (ignoring) two or more consecutive time points of the transition to the high level of the polarity-reversal timing signal (So), when two consecutive time points are received, an operation in which the polarity reversals of the inverter (Ui) are repeatedly performed.

Apparent from (d) of the figure, in this embodiment, the appearance time rate for the colors are not even, that is, that of R color is large, those of G and B colors are medium, and that of the W color is small. This reflects the size of each color area (occupancy angle) of the color wheel. In such a case, there is no problem, even if polar period lengths (τ31, τ32, τ33) opposite to the polarity of a DC component contained in the output current (IL'), that is, a period of the negative side polarity of the output current (IL') in a period during which the polarity-reversal mode is the second mode, becomes unequal. Thus, the present invention can be applied to a case where the time intervals from the polarity reversals of an inverter (Ui) to the following polarity reversals are unequal.

In addition, for example, a dynamic color filter is made up of a color wheel which consists of four colors of R, G, B, and W, in a similar manner. The present invention can be applied to a case where modulation for increasing or decreasing the output current (IL') is performed at the ratio defined by the color areas in a system in which the polarity reversal of the inverter (Ui) of the discharge lamp lighting apparatus (Ex) is performed at each color area transition. The mode of the output current at this time (IL') is shown in (b) of FIG. 11. Here, (a) of the figure is a polarity-reversal mode signal (Sc), (c) is the polarity-reversal timing signal (So), and (d) schematically shows the color appearing in the dynamic color filter.

In this figure, when the polarity-reversal mode is the first mode (Sc), i.e., the polarity-reversal mode signal is low level, every time the transition to the high level of the polarity-reversal timing signal (So) is received, the polarity reversal of the output current (IL'), i.e., the inverter (Ui), is performed. When the polarity-reversal mode is the second mode, i.e., the polarity-reversal mode signal (Sc) is high-level, after invalidating (ignoring) two or more consecutive time points of the transition to the high level of the polarity-reversal timing signal (So), when two consecutive time points are received, an operation in which the polarity reversals of the inverter (Ui) are repeatedly performed.

Apparent from (b) and (d) of the figure, in this embodiment, in the modulation of the output current (IL') as to the R and W colors, the output current (IL') is increased (for example, 125%), although the modulation by which the output current (IL') is increased is not performed (100%), as to G and B colors, there should be no difference between a modulation in a period when the polarity-reversal mode is the first mode, and that in a period when the mode is the second mode. There is no problem even if current values (i41, i42, i43) becomes unequal in a period of the negative side polarity of the output current (IL') when the polarity-reversal mode is the second mode, that is, a period in which a polarity thereof is opposite to the polarity of a DC component contained in the output current (IL'). Of course, the present invention can be applied to a case where such modulation is combined with that in which time intervals from polarity reversal of the inverter (Ui) to the following polarity reversal thereof are uneven as shown in FIG. 10.

In addition, as described here, in order to realize the power supply circuit (Ux) in which the modulation for increasing or decreasing the output current (IL') can be performed, a counter may be provided so that, for example, the polarity-reversal timing signal (So) is counted, and the counted value can be cleared by the modulation cycle initialization signal (Sop), and depending on the counted value of the counter, a value of the target lamp current in the electric supply control circuit (Fx) of the power supply circuit (Ux) can be increased by only a predetermined rate.

In addition, when the polarity-reversal mode is the first mode, although in the above embodiment, the inverter (Ui) inverts the polarity at every color transition of the dynamic color filter, the present invention is not limited thereto. For example, the present invention can be applied to a case in which two or more colors of the dynamic color filter appear between a polarity reversal and the following polarity reversal, or a case where a polarity reversal(s) takes place within a period when one color is appeared. Moreover, although, in the above embodiment, in which the level of the modulation for increasing or decreasing the output current (IL') is changed, synchronizing with transition of the color of the dynamic color filter when the polarity-reversal mode is the first mode, the present invention is not limited thereto. For example, it can be applied to a case where the level of modulation changes within a period when one color of the dynamic color filter appears.

The technology according to the present invention can be used together with other technology. For example, the weak point of the prior art can be supplemented by using the technology according to the present invention together with the prior art disclosed in Japanese Laid Open Patent No. 2007-087637. In a discharge lamp lighting apparatus for lighting a discharge lamp according to the prior art, electrodes are arranged at intervals of 2 mm or less in an electric discharge container made of quartz glass, and mercury of 0.20 mg or more per cube millimeter and halogen of $10^{-6}$ to $10^{-2}$ micromolar (μmol) per cube millimeter is enclosed in the discharge lamp. In the discharge lighting apparatus according to the prior art, while a frequency chosen from a range of 60-1000 Hz is supplied to the discharge lamp as a regular frequency, the frequency is lower than the regular frequency and is chosen from the range of 5-200 Hz, and the number of waves to be inserted is chosen from a range of one to ten units when a half cycle is regard as one unit. Further, a low frequency in which an interval inserted in the regular frequency is chosen from the range of 0.01 seconds to 120 seconds, is inserted when the lamp voltage (VL) is greater than a first predetermined value. On the other hand, the frequency is not inserted, when the lamp voltage (VL) is equal to or less than a second predetermined value which is (equal to or) less than the first predetermined value. In the technology, existence of a first projection at the tip of an electrode is premised, and lighting at the predetermined low frequency is inserted in order to prevent the unnecessary second (another) projection from occurring and growing. However, when the lamp voltage (VL) is low, if the frequency is inserted, since a temperature rise of the first projection becomes large beyond necessity so that while the low frequency is inserted, the first projection deforms or disappears by melting. Therefore, as described above, the control condition under which the low frequency is not inserted is provided, and under that condition, the lamp current is increased in order to realize target electric power. As a result, the lamp voltage (VL) is controlled so as to gradually rise by the weak feedback loop to cause a temperature rise of the electrodes, and by a natural electrode consumption.

When the electrodes (E1, E2) are designed so that a certain rated power is, for example, 200 W, and regular frequency is 360 Hz, while the lamp is lighted with alternating current at a low frequency of 45 Hz inserting two units at intervals of 0.02 second wherein a half cycle is regarded as one unit, if it is detected that the lighting voltage of the discharge lamp drops to 65 V or less, insertion of the alternating current at low frequency is stopped, whereby it is controlled to continuously pass the alternating current at a regular frequency of 360 Hz. Then, when the lighting voltage of the discharge lamp rises to 70 V or more, the power supply apparatus is controlled to perform a lighting operation, inserting alternating current at a low frequency again.

However, as described above, under the condition in which electric power is subtracted from rated power by light modulation control, for example, under the condition of 160 W, since electrode temperature tends to become lower than the case of rated power, the projection at the tip of an electrode tends to grow. Therefore, there is a problem that the efficiency of the weak feedback loop decreases under condition where insertion of the alternating current at a low frequency is stopped, and the lamp voltage cannot be immediately changed to a rise, so that it takes time to return to the desired range. In the discharge lamp lighting apparatus in such condition, the first voltage (Vt1) is set to, for example, 60 V, and the second voltage (Vt2) is set to, for example, 65 V, and the present invention is used together with the discharge lamp. It is possible to realize the discharge lamp lighting apparatus capable of always controlling the lamp voltage (VL) appropriately even in a rated lighting operation or in a lighting modulation operation.

That is, in the inverter control circuit (Uf), when the lamp voltage (VL) is 65 V or more, the inverter control signals (Sf1, Sf2) are generated so that the output current (IL'), in which two units of low frequency of 45 Hz is inserted at an interval of 0.02 second in the regular frequency 360 Hz, passes through the lamp by which low frequency 245 Hz unit was inserted in the regular frequency of 360 Hz at intervals of 0.02 seconds may be passed on a lamp. When it is detected that the lamp voltage (VL) became 65 V or less, insertion of the low frequency is stopped, and the inverter control signals (Sf1, Sf2) are generated so that the output current (IL') which is alternating current with the simple rectangle wave at only the regular frequency of 360 Hz may pass through the lamp. When it is detected that the lamp voltage (VL) became 60 V or less, the inverter control signals (Sf1, Sf2) are generated so that the output current (IL') which does not include AC component may pass through the lamp. =When it is detected that lamp voltage (VL) exceeds 65 V, the inverter control signals (Sf1, Sf2) are generated so that the output current (IL') which is a simple alternating current rectangle wave at only the regular frequency of 360 Hz may pass through the lamp. When it is detected that the lamp voltage (VL) exceeds 70 V, the inverter control signals (Sf1, Sf2) are generated so that the output current (IL') in which a low frequency is inserted in the regular frequency of 360 Hz may pass through the lamp.

In that operation, in the second mode, the amount of a DC component contained in the output current (IL') during a period of the second mode, as described above, can be dynamically changed according to lighting conditions. Moreover, the technology of changing dynamically the first voltage (Vt1) and/or the second voltage (Vt2) according to lighting conditions can be used therewith, and the controllability of the lamp voltage can also be enhanced.

In order to determine the amount of a DC component contained in the output current (IL'), for example, an optimal amount of a DC component, in case the polarity-reversal mode is the first mode or the second mode, it is necessary to quantify the amount of a DC component by a definition or measurement when desk study or experimental examination thereof is performed. In a mathematical treatment of a Fourier analysis etc., although the amount of a DC component is defined by the average calculated based on a period from the infinite past to infinite future, when working on an actual discharge lamp lighting apparatus as in the present invention, such a definition is not clearly appropriate. In such a case, finite time for measuring is set so as to define the amount of a DC component by using the average in that time. However, strictly speaking, the amount of a DC component measured depends on the length of the measuring time, at time when the average is computed for measurement, When this time is too short, since the amount of a DC component may be dependent on when timing measurement is started, there is a problem that a measurement result varies depending on when it measured. Therefore, the measuring time is set so long that such variation does not occur. For example, as in Japanese Laid Open Patent No. 2007-087637, it is suitable to specify the amount of the DC component by taking approximately 0.2 seconds which is one cycle length of the minimum of the low frequency to be inserted.

In this specification, the circuit structures are described at minimum, in order to explain the operations and the functions of the light source apparatuses according to the embodiment. Therefore, details of the circuit structures or the operations are determined at time of the design thereof. That is, for example, determinations of the polarity of signals, or originality and creativity, such as selections, additions, or omissions of concrete circuit elements, convenience of procurements of elements, or changes based on economic reasons are premised on being carried out at the time of the design of actual apparatus.

The mechanism for especially protecting circuit elements, such as switching elements (for example, FET) of a power supply apparatus, from breakage factors, such as an overvoltage, and overcurrent, or overheating, or the mechanism for reducing a radiation noise or a conduction noise, generated with an operation of the circuit element of the power supply apparatus or preventing the generated noise from releasing to the outside, for example, a snubber circuit, and a varistor, a clamp diode, a current restriction circuit (including a pulse by pulse system), a noise filter choke coil of a common mode, or normal mode, a noise filter capacitor, etc. are premised on being added to each part of circuit arrangement shown in the embodiments if needed. The structure of the discharge lamp lighting apparatus is not limited to the circuits disclosed in this specification, nor waveforms or timing charts described herein.

The preceding description has been presented only to illustrate and describe exemplary embodiments of the present discharge lamp lighting apparatus and projector. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus for turning on a discharge lamp having a lighting condition in which a projection is formed at a tip of an electrode for electric discharge, comprising;
   a power supply circuit which supplies electric power to the discharge lamp;
   a lamp voltage detection unit which detects a lamp voltage and generates a lamp voltage detection signal;
   an inverter which inverts an output voltage and passes an output current in form of an alternating current to the discharge lamp;
   a polarity-reversal mode control circuit which determines a polarity-reversal mode comprising a first mode and a second mode, based on the lamp voltage detection signal; and
   an inverter control circuit which generates an inverter control signal which specify a polarity-reversal operation of the inverter based on the polarity-reversal mode,
   wherein in a period of a lighting steady state, excluding an initial lighting period immediately after start up of the discharge lamp, when the polarity-reversal mode is the second mode, the inverter control circuit operates to generate the inverter control signal so that a DC component contained in the output current increases more than that in the first mode,
   when the polarity-reversal mode is the first mode, and it is detected that the lamp voltage is lower than a predetermined first voltage, the polarity-reversal mode control circuit changes the polarity-reversal mode into the second mode, and
   when the polarity-reversal mode is the second mode, and it is detected that the lamp voltage is higher than a predetermined second voltage, the polarity-reversal mode control circuit changes the polarity-reversal mode into the first mode.

2. The discharge lamp lighting apparatus according to claim 1, wherein the output current does not contain an AC component in a period where the polarity-reversal mode is the second mode.

3. The discharge lamp lighting apparatus according to claim 1, wherein in a period where the polarity-reversal mode is the second mode, the inverter control circuit performs an operation so that the polarity of a DC component is reversed from one polarity to the other polarity.

4. The discharge lamp lighting apparatus according to claim 2, wherein in a period where the polarity-reversal mode is the second mode, the inverter control circuit performs an operation so that the polarity of a DC component is reversed from one polarity to the other polarity.

5. The discharge lamp lighting apparatus according to claim 3, wherein the second voltage is higher than the first voltage, and when the lump voltage reaches a value obtained by adding the first voltage and the second voltage, and then dividing a result of the addition by two, the polarity of the DC component contained in the output current is changed from one polarity to the other polarity.

6. The discharge lamp lighting apparatus according to claim 4, wherein the second voltage is higher than the first voltage, and when the lump voltage reaches a value obtained by adding the first voltage and the second voltage, and then dividing a result of the addition by two, the polarity of the DC component contained in the output current is changed from one polarity to the other polarity.

7. The discharge lamp lighting apparatus according to claim 3, wherein when the lamp voltage reaches a value obtained by adding a minimum value of the lamp voltage and the second voltage and then dividing a result of the addition by two, the polarity of the DC component contained in the output current is changed from one polarity to the other polarity.

8. The discharge lamp lighting apparatus according to claim 4, wherein when the lamp voltage reaches a value obtained by adding a minimum value of the lamp voltage and the second voltage and then dividing a result of the addition by two, the polarity of the DC component contained in the output current is changed from one polarity to the other polarity.

9. The discharge lamp lighting apparatus according to claim 1 wherein the polarity of a DC component which appears when the polarity-reversal mode is changed into the second mode from the first mode appear, is made to an opposite polarity to that of a DC component which appears when the polarity-reversal mode is changed into the second mode from the first mode last time.

10. A projector which projects an image using light flux generated by a discharge lamp, wherein the discharge lamp is started and lighted by the discharge lamp lighting apparatus according to claim 1.

11. The projector according to claim 10, wherein the light flux is converted to color sequential light flux by a dynamic color filter and an image is projected thereby and the inverter control circuit generates the inverter control signal, synchronizing with an operation of the dynamic color filter.

* * * * *